(12) United States Patent
Marcellino

(10) Patent No.: US 8,630,624 B2
(45) Date of Patent: Jan. 14, 2014

(54) MANAGING NOTIFICATION MESSAGES

(75) Inventor: Christopher Marcellino, Cleveland, OH (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 13/195,772

(22) Filed: Aug. 1, 2011

(65) Prior Publication Data

US 2011/0289172 A1 Nov. 24, 2011

Related U.S. Application Data

(63) Continuation-in-part of application No. 12/392,679, filed on Feb. 25, 2009, now Pat. No. 8,364,123.

(60) Provisional application No. 61/370,075, filed on Aug. 2, 2010.

(51) Int. Cl.
*H04L 12/58* (2006.01)
*H04W 4/00* (2009.01)
*G06F 15/16* (2006.01)

(52) U.S. Cl.
USPC ........ 455/412.1; 709/224; 709/204; 709/206; 709/207; 455/3.01; 455/418; 455/466

(58) Field of Classification Search
USPC ............. 455/412.1, 418, 466, 3.01; 709/224, 709/204, 206, 207, 22
See application file for complete search history.

(56) References Cited

U.S. PATENT DOCUMENTS

| | | | |
|---|---|---|---|
| 5,410,543 A | 4/1995 | Seitz et al. | |
| 6,424,354 B1 | 7/2002 | Matheny et al. | |
| 6,512,930 B2 | 1/2003 | Sandegren | |
| 6,763,384 B1 * | 7/2004 | Gupta et al. | 709/224 |
| 7,499,995 B2 | 3/2009 | Armstrong | |
| 7,685,265 B1 * | 3/2010 | Nguyen et al. | 709/223 |
| 7,853,674 B2 * | 12/2010 | Shenfield et al. | 709/221 |
| 7,987,246 B2 * | 7/2011 | Tsuji et al. | 709/220 |

(Continued)

FOREIGN PATENT DOCUMENTS

WO   WO 2004/043098 A1   5/2004

OTHER PUBLICATIONS

David Chartier, "Lots to Like About New iPhone 2.2 Software Update", Tech Policy Summit, Published Nov. 21, 2008, 5 pages.

(Continued)

*Primary Examiner* — Jinsong Hu
*Assistant Examiner* — William Nealon
(74) *Attorney, Agent, or Firm* — Park, Vaughan, Fleming & Dowler LLP

(57) ABSTRACT

Methods and apparatuses that generate a subtopic identifier identifying a client application within a client device are described. The client application may be associated with a server application hosted in one or more application servers. Notification services may be registered with the application servers from the client application to forward identifiers associated with the client application to the server application to enable the server application to push notification messages to the client device selectively for the client application. When receiving a notification message from the application server, the notification message may be examined to forward the notification message directly to the client application without invoking other applications in the client device if the notification message carries a subtopic identifier of the client application.

20 Claims, 8 Drawing Sheets

(56) References Cited

U.S. PATENT DOCUMENTS

| | | |
|---|---|---|
| 2003/0061365 A1 | 3/2003 | White et al. |
| 2006/0064700 A1* | 3/2006 | Ludvig et al. ............... 719/318 |
| 2007/0050630 A1* | 3/2007 | Kumar et al. ............... 713/182 |
| 2009/0204666 A1 | 8/2009 | Sana et al. |
| 2009/0245176 A1 | 10/2009 | Balasubramanian et al. |
| 2009/0298470 A1 | 12/2009 | Huber et al. |
| 2010/0138501 A1* | 6/2010 | Clinton et al. ............... 709/206 |
| 2010/0216434 A1 | 8/2010 | Marcellino et al. |

OTHER PUBLICATIONS

PCT International Search Report and Written Opinion for PCT International Appln No. PCT/US2012/048801 mailed Mar. 25, 2013. (12 pages).

* cited by examiner

MANAGING NOTIFICATION MESSAGES

CROSS-REFERENCE TO RELATED APPLICATIONS

This application is a continuation-in-part of U.S. application Ser. No. 12/392,679, filed Feb. 25, 2009, and claims the benefit of U.S. Provisional Application No. 61/370,075, filed on Aug. 2, 2010, entitled "Managing Notification Messages", CHRISTOPHER MARCELLINO, which are hereby incorporated by reference herein in its entirety.

FIELD OF THE INVENTION

The present invention relates generally to data processing systems. More particularly, this invention relates to notification messages for mobile devices.

BACKGROUND

Users of mobile devices (e.g., laptops, palmtops, mobile phones, smartphones, multimedia phones, portable media players, GPS units, mobile gaming systems, etc.) may have applications installed that periodically receive notification messages from notification services. For example, such applications include "push" email services (e.g., MobileMe, Microsoft Exchange ActiveSync, push-IMAP, Yahoo! Push, etc.) or other push services (e.g., update/upgrade services, news services, weblog services, podcast services, social networking services, or other types of services where notification messages may be sent.). Notification messages typically represent events of interest which are typically defined by the applications (e.g., new email indicator, new news item indicator, new podcast indicator, change of online status of a social networking friend, etc.).

Usually, a notification message may be routed through a push service by identifying its corresponding originating server and receiving client device. On receiving the notification message, the client device may deliver the message to a target client application. Often times, multiple client applications in the client device may be waiting for notification messages from the same originating server at the same time. Each waiting client application may be invoked when the notification message arrives. As more and more server applications are hosted in the originating server for supporting ever increasing number of client applications in the client device, valuable processing resources in the client device may be wasted for managing message notification.

As such, existing mechanisms to provide message notification for mobile devices may tax resources and/or pose other problems.

SUMMARY OF THE DESCRIPTION

The invention can provide multiple levels of naming hierarchies capable of addressing individual client applications for efficiently delivering notification messages in a client device to minimize resources usage. Multiple server applications hosted in a common server identified by a server identifier or a topic can push notifications messages sharing the same topic to the client device. A subtopic can be embedded in a notification message received for the topic in the client device for identifying a target client application subscribing to the topic.

In one embodiment, a client application can optionally register a client application identifier as a subtopic in a corresponding server application running in a server identified by a topic. The subtopic may be an additional level of naming hierarchy for the client application. As a result, a notification message pushed from a server application hosted in the server can carry the client application identifier to allow routing the notification message directly to the client application without invoking or notifying other client applications subscribing to the shared topic. Multiple notification messages from separate sever applications hosted by one server of a topic can be multiplexed to destined separate client applications listening to the same topic at a client device effectively and efficiently to minimize resource usage of the client device required to handle received notification messages.

In one embodiment, a method and apparatus are described herein to generate a subtopic identifier identifying a client application within a client device. The client application may be associated with a server application hosted in one or more application servers. The client application can register notification service with the application server to forward identifiers associated with the client application and enable the server application to push notification messages to the client device selectively for the client application. When receiving a notification message from the application server, the notification message may be examined or inspected to be forwarded directly to the client application without invoking other applications in the client device if the notification message carries a subtopic identifier of the client application.

In another embodiment, a registration request for message notification may be received by a server application over a first network connection from a client application running in a client device. The first network connection may be established on an initiation from the client device to an application server with a server identifier to host the server application. The request may carry identifiers including a device token identifying the client device and a client application identifier identifying the client application. The server identifier may be sent to the client device to allow the client device to listen to messages pushed from the application server. In one embodiment, the identifiers carried in the request may be stored to register the client device for the message notification. The application server may send or push notification messages to the client device over a second network connection to a push network coupled with the client device via the device token to notify the client application. The notification messages may by identified by the server identifier. Optionally, the notification messages may carry the client application identifier to enable the client device to deliver the notification messages directly to the client application.

Other features of the present invention will be apparent from the accompanying drawings and from the detailed description that follows.

BRIEF DESCRIPTIONS OF THE DRAWINGS

The present invention is illustrated by way of example and not limitation in the figures of the accompanying drawings in which like references indicate similar elements.

DETAILED DESCRIPTION

Figure 1:
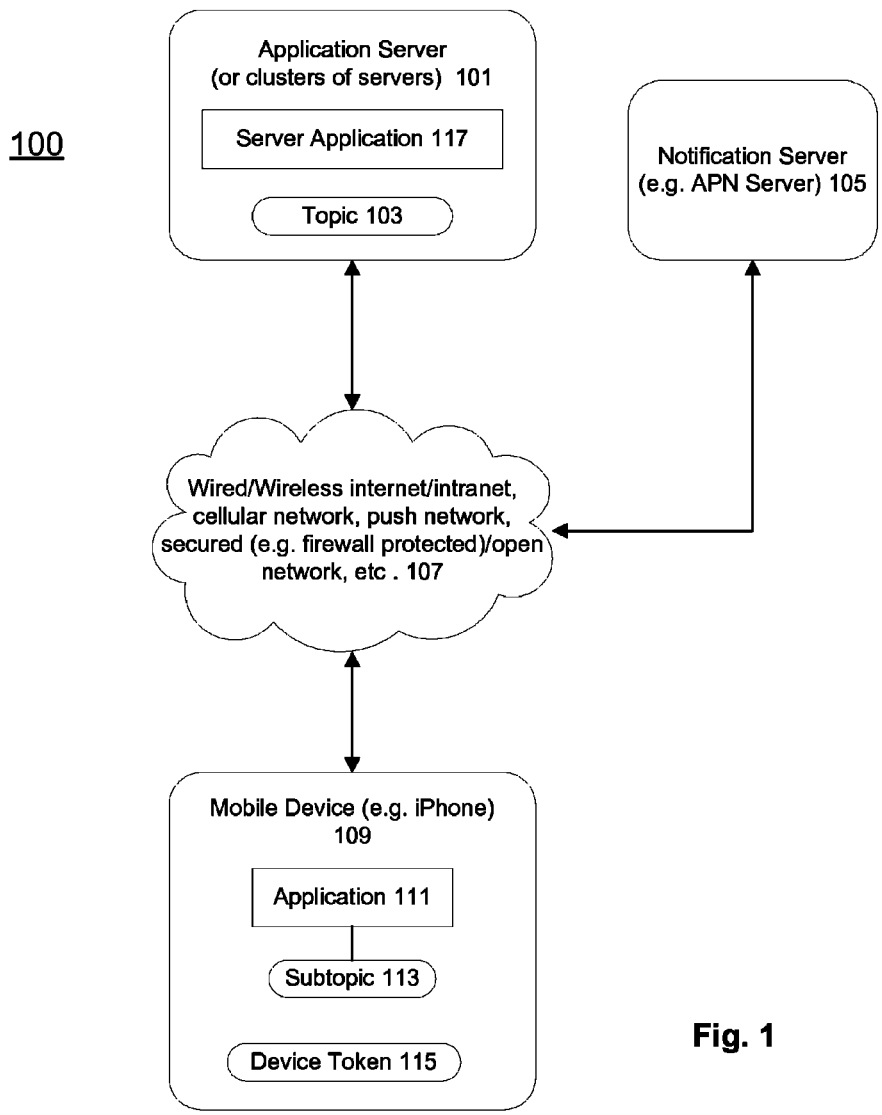
FIG. 1 is a block diagram illustrating one embodiment of networked systems for message notification.

Method and apparatus for notifications messages identifying a target client application among multiple client applications listening or subscribing to a common application server are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone and handheld computer with a multi-touch input device.

In one embodiment, a server hosting a server application such as a mail server, an IMAP (Internet Access Message Protocol) server, a calendar server, a contact server, a device management server, or other applicable server applications, etc. can maintain push capabilities by requiring a push provider certificate from a service authority (e.g. Apple Inc.) in order to communicate notifications to client devices. A client application running in a client device can query capabilities of an application server hosting a corresponding server application via a connection established from the client device to the application server. If the query result indicates the application server is push service aware or capable of providing push service, the client application can send a push service command to identify itself to the server application.

In particular, a client application running in a client device can present, via a push service command, a device token of the client device to a server application to allow a server hosting the server application to push messages or notifications to the client device. In response to the push service command, the server application can identify a notification topic or an identifier for the server which the client device can listen to or watch for receiving messages pushed from the server.

In some embodiments, a push service command from a client application to a server application can include named value pairs such as a version number for a push protocol for the corresponding application, an account identifier, a device token to allow the a server (e.g. running the server application) to contact a client device hosting the client application and/or a subtopic identifier identifying the client application.

The account identifier and/or the subtopic identifier may remain opaque to the server to be passed to a push service (or a push server). Notification messages to the client device for the client application may carry along the account identifier and the subtopic identifier.

In one embodiment, a response to a push service command from a server application to a client application can include named values including a version number for a push protocol and a topic identifier associated with a server hosting the server application. The topic identifier may be used to register a provider certificate for the server to enable the server to push notification messages to a client device running the client application. In certain embodiments, the client device and the server may perform handshake exchanges via the push service command/response, for example, to negotiate a version of the push protocol for message notification from the server application to the client application (e.g. identifying highest supported version for both the server and client applications).

According to one embodiment a subtopic for client applications may provide one or more additional levels of indirection on top of a topic associated with application servers. For example, a subtopic may direct notification messages targeting a client application. A client application can register for a topic and subtopic pair. Alternatively, a client application and an application server may not be tightly coupled via a subtopic based mechanism. Multiple (client) applications can register for a common subtopic in a topic.

A subtopic may be forwarded from a client application to a server application for registration. In certain embodiments, a subtopic or other levels of naming hierarchies may be registered for a client application for a server application without a need to forwarding the subtopic by the client application.

To illustrate, according to one embodiment, a Contact application, a Calendar application and a Word application may belong to an Office suite of applications. The Contact application may register a subtopic "contacts" under a general topic "office". The Calendar application may choose to register for the exact same subtopic (i.e. "contact") and topic pair (i.e. "contact" and "office") as for the Contact application in order to provide a better, more up-to-date usage experience, e.g. to add birthdays. The Word application, however, may register under the general topic "office" without registering for the subtopic "contact". Thus, registering with a subtopic may not to necessarily enforce a one-to-one mapping for (or to target) a specific application. A server may not need to know or share subtopic information with a client. For example, the server may associate a change in contact data with a specific subtopic, e.g. "contact" and use the subtopic for a push protocol as an inherent mechanism.

FIG. 1 is a block diagram illustrating one embodiment of networked systems for message notification. Networked systems 100 may include one or more servers (or hosts), such as application server 101, a notification server 105, e.g. APN (Apple Push Network) server, coupled to one or more devices, such as mobile device 109 (e.g. an iPhone device) via networks 107. In one embodiment, network 107 may allow network connections (e.g. for sending a push notification) between notification server 105, mobile device 109 and/or application server 101 via the open Internet, an intranet, firewall protected secure networks, wide area cellular networks (e.g. a 3G network), etc. Networks 107 may be wired, wireless (such as Wi-Fi, Bluetooth etc), or a combination of both.

According to one embodiment, application server 101 may include one single server device or a cluster of locally or remotely distributed server devices. Application server 101 may host one or more separate server applications, such as server application 117, serving corresponding client applications running in client devices, such as mobile device 109. Server applications may include a mail server, a calendar server, a contact server, a device management server or other applicable server applications. In one embodiment, application server 101 may register a certificate from notification server 105 to push or send notification messages to mobile device 109. The registration may assign topic 103 as an identifier (e.g. included in a registered certificate) identifying application server 101. Mobile device 109 may listen to topic 103 for messages originating from application server 101 via a push service, such as Apple Push Network Service from Apple Inc., provided by notification server 105.

In one embodiment, mobile device 109 can host multiple client applications including application 111. A client application can be a mobile mail application, calendar application, contact application, device management application or other applicable client application which may be served by a corresponding server application. Mobile device 109 may register with a push service, e.g. via notification server 105, to obtain a device token 115 for enabling the mobile device 109 to receive messages pushed from a server, such as application server 101, via the push service. Device token 115 may identify and/or certify mobile device 109 for routing notification messages via the push service. Additionally, subtopic 113 may be generated in mobile device 109 to uniquely identify application 111 among different client applications in the device.

In one embodiment, application 111 may forward device token 115 and subtopic 113 to a corresponding server application 117 for application server 101 to push notification messages to mobile device 109. In turn, application server 101 may reply with topic 103 for mobile device 109 to listen to for receiving notification messages pushed from application server 101. The notification messages may embed subtopic 113 to allow mobile device 109 to directly deliver the messages to application 111 identified by subtopic 113 without invoking other client applications in the device.

Figure 2:
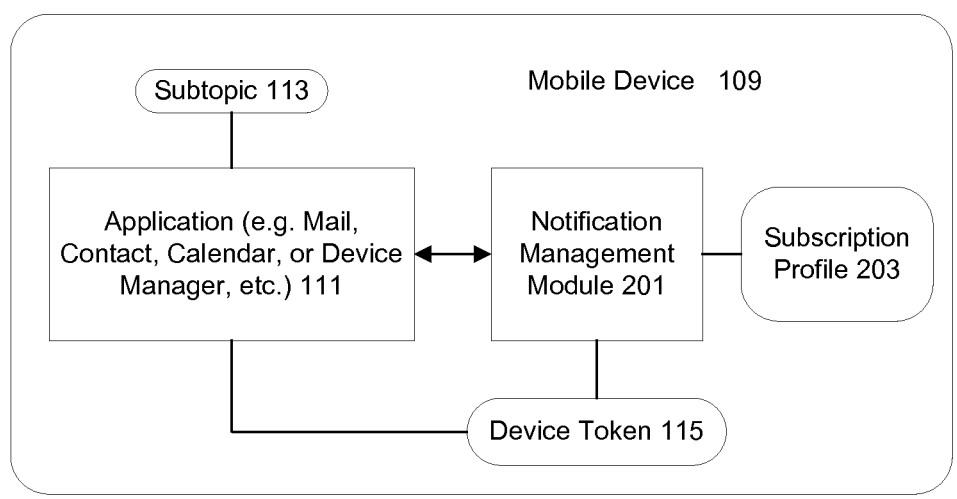
FIG. 2 is a block diagram illustrating exemplary components in a mobile device for managing notification messages according to the embodiments described herein.

FIG. 2 is a block diagram illustrating exemplary components in a mobile device for managing notification messages according to the embodiments described herein. For example, mobile device 109 may register for a push service via network systems 100 of FIG. 1. In one embodiment, notification management module 201 may provide a framework for the push service inside mobile device 109. Notification management module 201 may receive device token 115 during a service (e.g. push service) connection process to identify mobile device 109 as certified or trusted to receive notification messages pushed via the push service. In one embodiment, notification management module 201 may determine whether a message pushed from the push service is destined for mobile device 109 according to whether the message matches or includes device token 115.

According to one embodiment, notification management module 201 may generate subtopic 113, e.g. in response to a request from application 111, as a client application identifier identifying application 111 within mobile device 109. Application 111 may forward subtopic 113 and device token 115 to register for receiving message notification from a corresponding server application, such as sever application 117 of FIG. 1. In one embodiment, application 111 may subscribe or listen to a topic, such as topic 103 of FIG. 1, via notification management module 201. More than one application in mobile device 109 may register or subscribe to a common topic. Notification management module 201 may topic subscription data in subscription profile 203 indicating which topic is currently being subscribed by which application.

On receiving a notification message pushed over a push service, notification management module 201 can extract a token from the arriving notification message to determine if the notification message is destined for mobile device 109 based on, for example, a match between the token and device token 115. Notification management module 201 may identify a topic from the received notification message to identify which client applications should be notified with the received notification message according to subscription profile 203. Optionally, notification management module 201 may determine whether the received notification message carries a subtopic (e.g. a string) to deliver the received notification message directly to a client application identified by the subtopic string, such as application 111 identified by subtopic 113, without invoking or notifying other applications also subscribing to the topic included in the received notification message.

Figure 3:
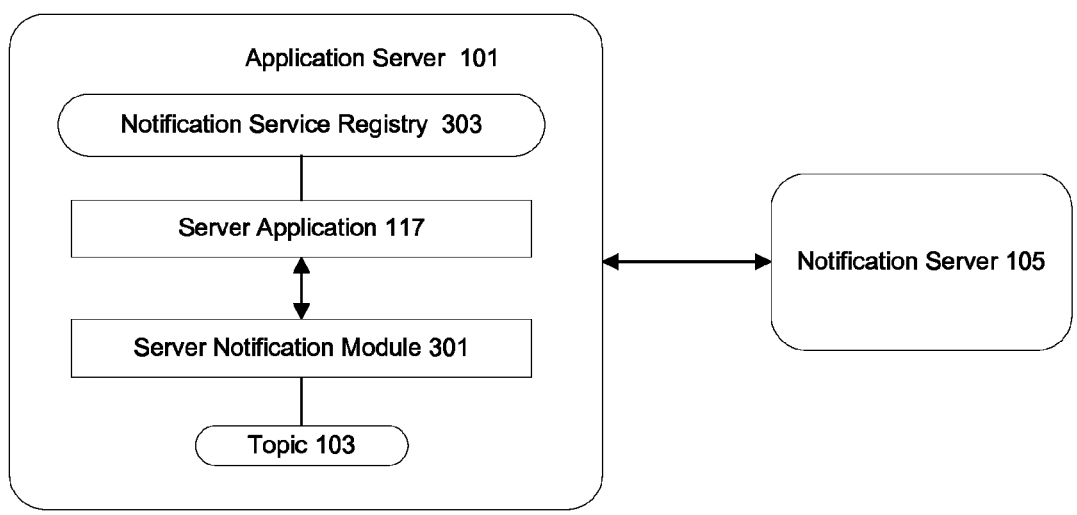
FIG. 3 is a block diagram illustrating exemplary components for an application server to provide notification messages.

FIG. 3 is a block diagram illustrating exemplary components for an application server to provide notification messages. For example, application server 101 may push notification messages to client devices via notification sever 105 over network systems 100 of FIG. 1. In one embodiment, notification module 301 may receive topic 103 to identify application server 101 as part of a certificate received from an authority of a push service. Server application 117 may pass topic 103, e.g. retrieved via notification module 301, to a client device, such as mobile client 109 of FIG. 1, to enable the client device to listen to messages pushed from application server 101.

In one embodiment, notification service registry 303 may store device tokens and associated data received from registered client devices for message notification from server application 117 or other server applications hosted in application server 101. Notification service registry 303 may be based on memory or mass storage devices locally or remotely coupled to application server 101. In one embodiment, a device token in notification service registry 303 may be associated with data such as subtopics forwarded from a client application to register for message notification. The associated data may remain opaque to application server 101 and/or notification server 105. For example, no processing resources may be allocated in application server 101 for the associated data except for storing, retrieving, removing and/or forwarding these data. When pushing a notification message to a client device identified by a device token, sever application 117 may forward the device token together with its associated data and topic 103 to notification server 105, for example, via notification module 301.

Figure 4:
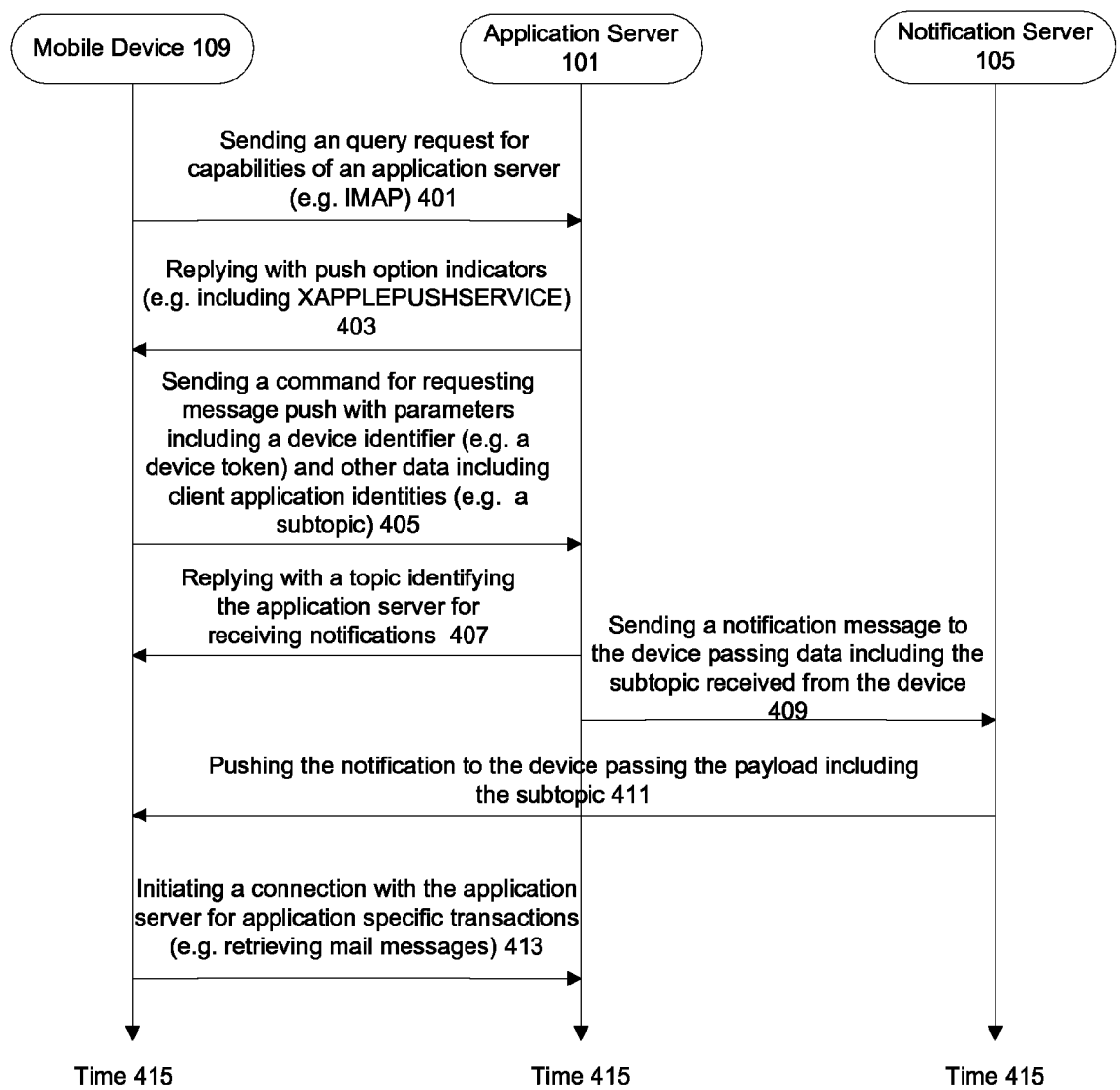
FIG. 4 is a sequence diagram illustrating exemplary message exchanges between a mobile device and an application server according to the embodiments described herein.

FIG. 4 is a sequence diagram illustrating exemplary message exchanges between a mobile device and an application server according to the embodiments described herein. In one embodiment, mobile device 109, application server 101 and notification 105 may be coupled with each other via network 107 of FIG. 1. Mobile device 109 may receive a device token, such as device token 115 of FIG. 1, from push service, e.g. via notification server 105, prior to registering for message notification application server 101, e.g. before instance 401. Application server 101 may receive a certificate from a secure authority of a push service to authorize application server 101 to establish a connection to a push server, such as notification server 105. The certificate received may include a topic as a string, such as topic 103 of FIG. 1, for identifying application server 101.

In one embodiment, a client application, e.g. mobile mail, of mobile device 109 may initiate a network connection with a corresponding server application, e.g. an IMAP server, hosted in application server 101 to register for message notification from the server application. At sequence 401, the client application may initiate a network connection between mobile device 109 and application server 101 to send a query request for inquiring which capabilities are supported by the server application. In response, at sequence 403, the server application may reply with indicators indicating availability of a push option, for example, based on a protocol including XAPPLEUSHSERVICE indicator.

In turn, at sequence 405, a client application may send a command from mobile device 109 to application server 101 to register for message push or notification. The command may include parameters with names or identifiers to allow a server application to address mobile device 109 and/or the client application. In one embodiment, the parameters may be based on named values including a device token of mobile device 109. Optionally, the parameters may include a subtopic, e.g. "com.apple.mobilemail", uniquely owned by the client application within mobile device 109. At sequence 407, an application server may reply with a topic identifying application server 101. A topic may be a string, e.g. "com.google.push", which can be used to identify messages pushed from application server 101 via a push service shared by multiple servers. Additional application specific transactions may be exchanged over the same network connection established for registering message notification between mobile device 109 and application server 101. This network connection may be disconnected while mobile device 109 is waiting for notifications from application server 101.

Subsequently, a server application may generate a notification message to be pushed to mobile device 109, e.g. in response to occurrences of certain application specific events, such as the arrival of new mails in an IMAP server. The server application may package the notification messages with a device token and passing data associated with the device token, for example, including a subtopic of a client application registered (or stored) for mobile device 109. At sequence 409, application server 101 may send the notification message with a topic identifying the application server 101 via notification server 105 to mobile device 109. In turn, at sequence 411, notification server 105 may push the notification message to mobile device 109 via a push network service.

On the arrival of a notification message, mobile device 109 may verify a topic and/or a device token of the message before forwarding the message to interested client applications. Mobile device 109 may ignore the message if the verification fails (e.g. the topic is not subscribed and/or the device token does not match a local device token). Optionally, mobile device 109 may extract a subtopic from a payload of the notification message to deliver the notification message only to the client application named by the subtopic without forwarding to other applications subscribing to the topic. Mobile device 109 may invoke the client application if the client application is in a sleep state or not currently running to receive the notification message. In turn, at sequence 413, the client application may initiation a connection with a corresponding server application in application server 101 to perform application specific transactions (e.g. retrieving mail messages).

Figure 5:
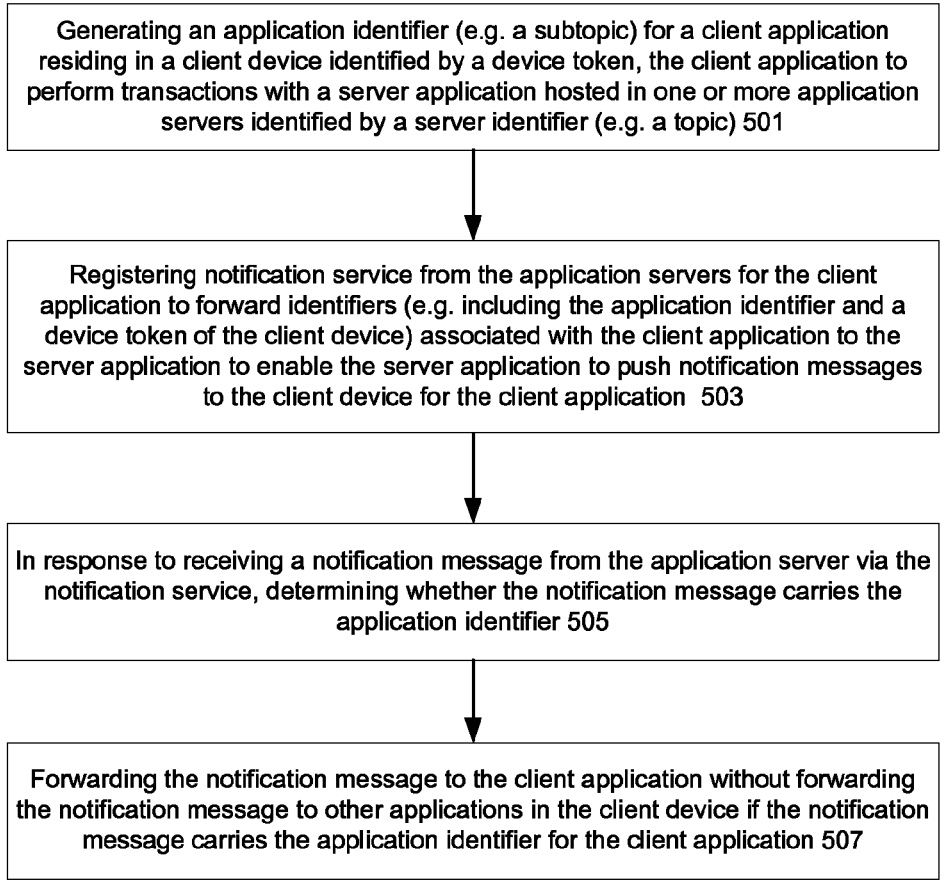
FIG. 5 is a flow diagram illustrating one embodiment of a process to enable a mobile device to route a notification message to an identified client application.

FIG. 5 is a flow diagram illustrating one embodiment of a process to enable a mobile device to route a notification message to an identified client application. Exemplary process 500 may be performed by a processing logic that may comprise hardware (circuitry, dedicated logic, etc.), software (such as is run on a dedicated machine), or a combination of both. For example, process 500 may be performed by some components of system 100 of FIG. 1. At block 501, the processing logic of process 500 can generate an application identifier (e.g. a subtopic) for a client application residing in a client device identified by a device token, the client application to perform transactions with a server application hosted by one or more application servers identified by a server identifier (e.g. a topic).

At block 503, in one embodiment, the processing logic of process 500 may register message notification service from application servers for a client application. The processing logic of process 500 may forward identifiers (e.g. including a subtopic for the client application identifier and a device token of the client device) associated with the client application to a server application hosted in the application servers to enable the server application to push notification messages to the client device for the client application.

At block 505, in response to receiving a notification message from an application server, the processing logic of process 500 may determine whether the notification message carries an application identifier. In one embodiment, the processing logic of process 500 may extract a token and a topic (e.g. based on named values) from the notification message to verify if the notification message is intended to be received by a mobile device. In one embodiment, the processing logic of process 500 may identify the application identifier, e.g. a subtopic, from a payload of the notification message.

If an application identifier or a subtopic is identified, at block 507, the processing logic of process 500 may forward the notification message to a client application identified by the subtopic without forwarding the notification message to other applications subscribing to a topic of the notification message. The processing logic of process 500 may select the client application identified by the subtopic among multiple client applications subscribing to the topic in a client device. Otherwise, if no subtopic is found in the notification message, the processing logic of process 500 may forward the notification message to each client application subscribing to the topic for the client application to determine whether to process the notification message (e.g. based on content carried in the message).

Figure 6:
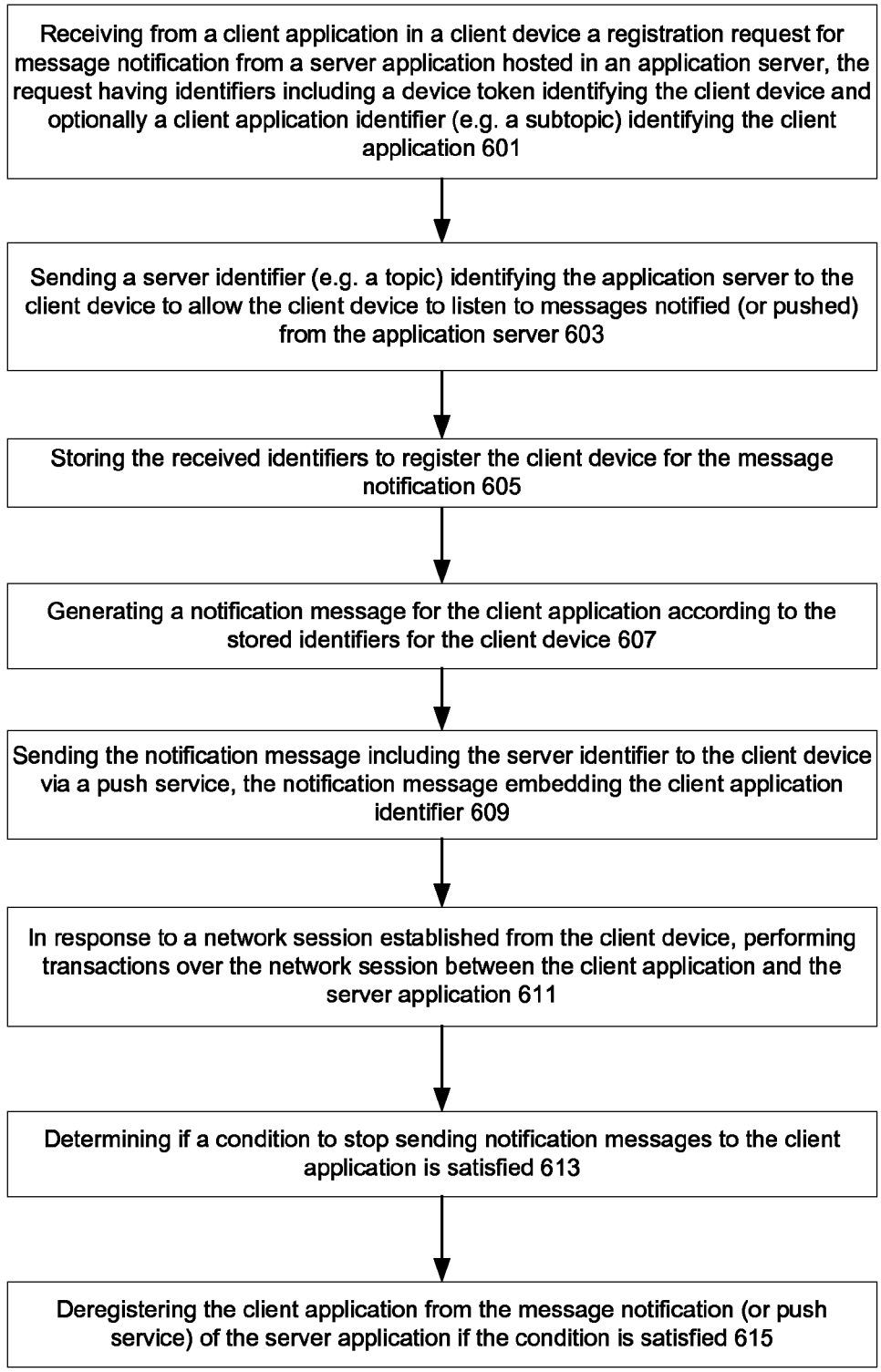
FIG. 6 is a flow diagram illustrating one embodiment of a process to provide notification messages from an application server to an application client.

FIG. 6 is a flow diagram illustrating one embodiment of a process to provide notification messages from an application server to an application client. Exemplary process 600 may be performed by a processing logic that may comprise hardware (circuitry, dedicated logic, etc.), software (such as is run on a dedicated machine), or a combination of both. For example, process 600 may be performed by some components of system 100, such application server 101 in FIG. 1. At block 601, the processing logic of process 600 can receive a registration request from a client application in a client device for message notification from a server application hosted in an application server. The registration request may include an identifier for the client device (e.g. a device token) and optionally an additional identifier for the client application (e.g. a subtopic).

At block 603, the processing logic of process 600 may send a server identifier (e.g. a topic) identifying an application server to a client device to allow the client device to listen to messages notified (or pushed) from the application server. In one embodiment, the processing logic of process 600 may store the identifiers including a device token for a push service to address a notification message for the client device at block 605. The stored identifiers may include a subtopic to identify a client application in the client device for receiving the notification message.

In one embodiment, at block 607, the processing logic of process 600 may generate a notification message for a client application registered for receiving the message according to stored identifiers for a client device hosting the client application. For example, the notification message may indicate an occurrence of an event in a server application related to an account associated with the client application, such as the arrival of new mail messages, a chat request, a schedule update, or other applicable events. The notification message may be packaged with a client token identifying the client device and a payload including a subtopic identifying the client application. At block 609, the processing logic of process 600 may send the notification message including a topic identifying an originating application server to the client device via a push service. The notification message may carry the subtopic embedded in a payload of the message for identifying the client application. Subsequently at block 611, the processing logic of process 600 may perform application specific transactions over a network session established from the client application with the server application.

At block 613, the processing logic of process 600 may determine if a condition to stop sending notification messages to a client application or a client device is satisfied. The client application may have registered for receiving the notification messages from a server application. In one embodiment, the processing logic of process 600 may monitor a duration or elapse time for the client device since sending a latest notification message to the client device. If the duration exceeds a threshold (e.g. one day, 12 hours, etc., which may be preconfigured or dynamically configured), the condition to stop sending notification messages to the client device may be satisfied. At block 615, the processing logic of process 600 may deregister the client device from the message notification (or push service) of the server application if the condition is satisfied. The client device may be removed from a list of notification recipients for the server application. For example, the processing logic of process 600 may remove entries associated with a device token identifying the client device, including data carrying a subtopic identifying the client application of the client device, from a registry for message notification.

Figure 7:
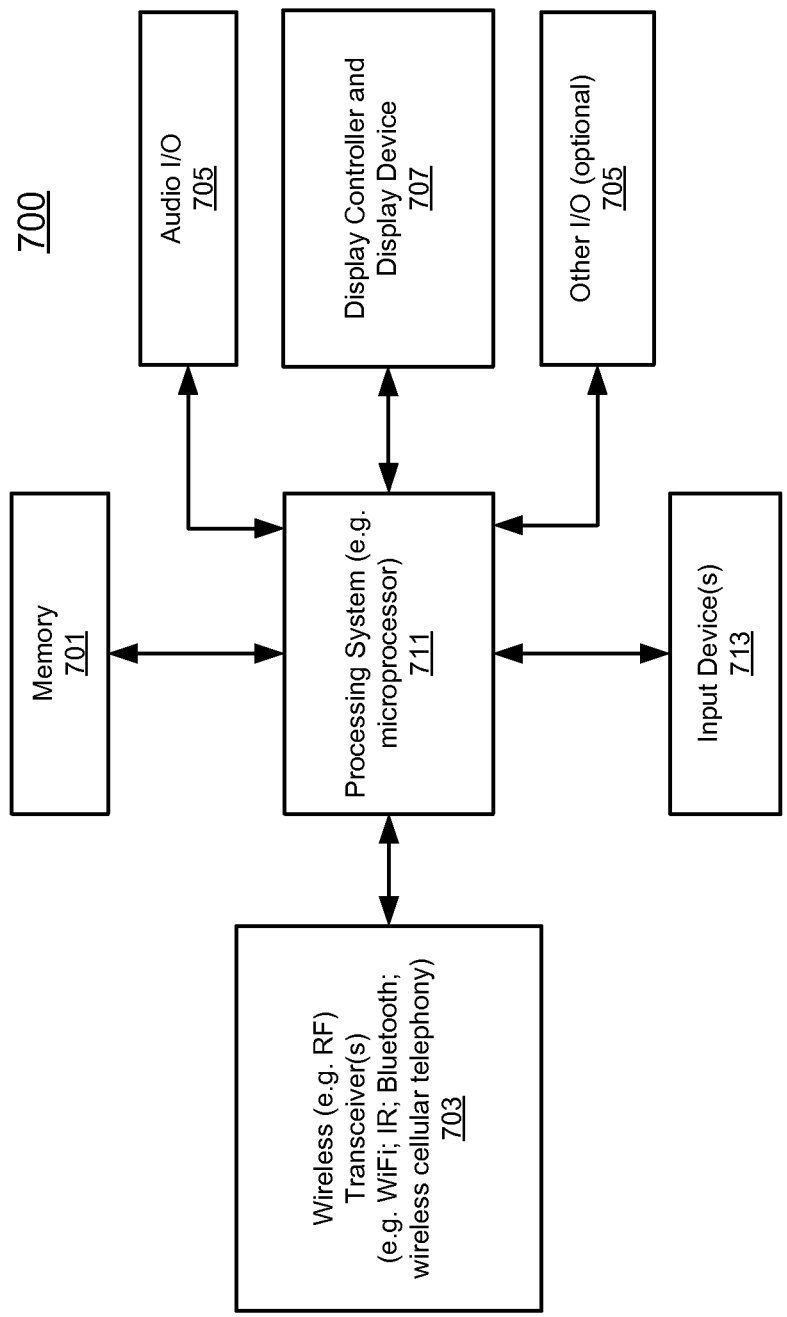
FIG. 7 shows one example of a data processing system which may be used with the embodiments described herein.

FIG. 7 shows one example of a data processing system which may be used with the embodiments described herein. The data processing system 700 shown in FIG. 7 includes a processing system 711, which may be one or more microprocessors, or which may be a system on a chip integrated circuit, and the system also includes memory 701 for storing data and programs for execution by the processing system. The system 700 also includes an audio input/output subsystem 705 which may include a microphone and a speaker for, for example, playing back music or providing telephone functionality through the speaker and microphone. The system 700 can, in at least certain embodiments, request the one or more profiles described herein and download those profiles to configure the device for communication through a network. The system 700 can download those profiles from a server data processing system which may be the system shown in FIG. 7. In one embodiment, the system 700 may be the device 111 shown in FIG. 1.

A display controller and display device 707 provide a visual user interface for the user; this digital interface may include a graphical user interface which is similar to that shown on a Macintosh computer when running OS X operating system software. The system 700 also includes one or more wireless transceivers 703 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 700 in certain embodiments, and in certain embodiments fewer components than shown in FIG. 7 may also be used in a data processing system.

The data processing system 700 also includes one or more input devices 713 which are provided to allow a user to provide input to the system. These input devices may be a keypad or a keyboard or a touch panel or a multi touch panel. The data processing system 700 also includes an optional input/output device 715 which may be a connector for a dock. It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 700 may be a network computer or an embedded processing device within another device, or other types of data processing systems which have fewer components or perhaps more components than that shown in FIG. 7.

Figure 8:
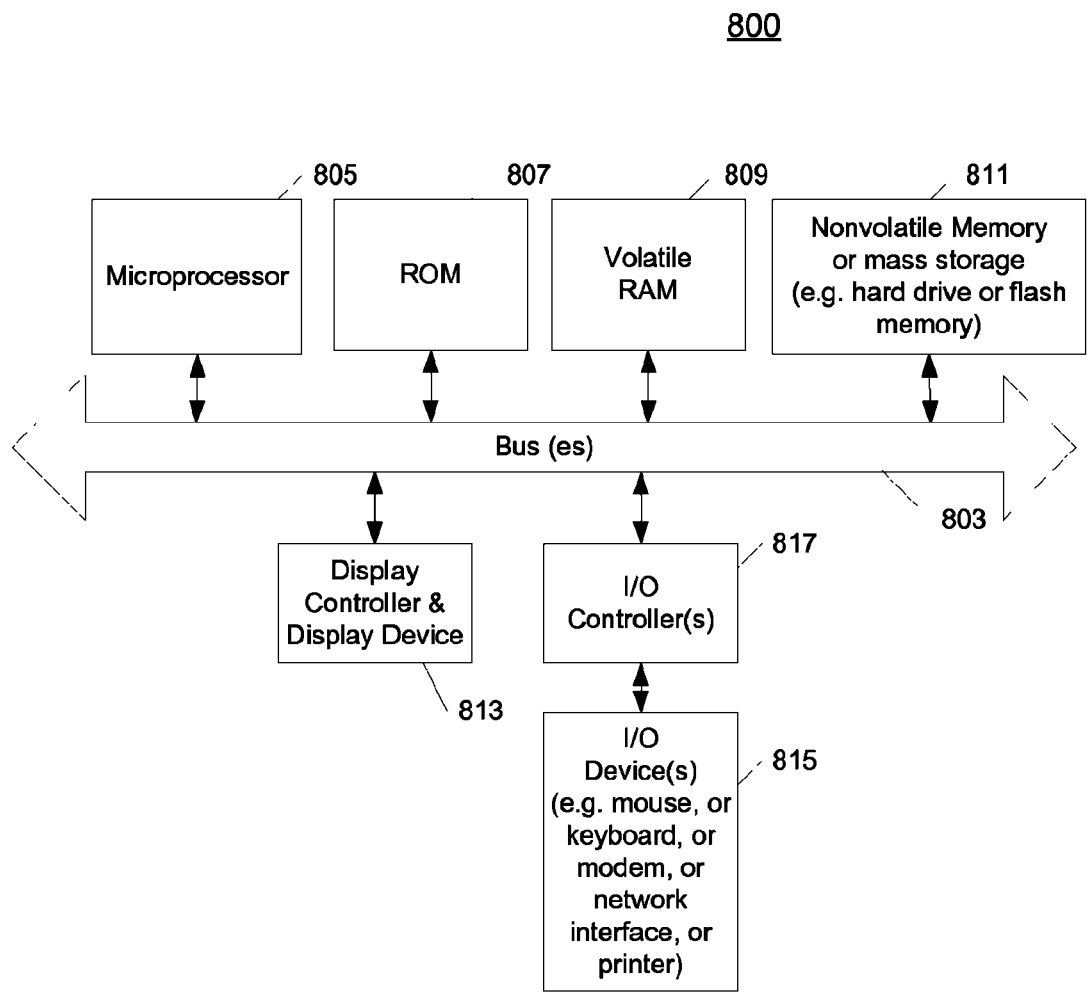
FIG. 8 illustrates an example of a typical computer system which may be used in conjunction with the embodiments described herein.

FIG. 8 shows one example of a data processing system which may be used with one embodiment of the present invention. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. FIG. 8 may represent the server system shown in FIG. 1.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory systems which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-readable non-transitory medium having instructions, when executed by a machine, cause the machine to perform a method for message notification, the method comprising:
   generating a subtopic identifier identifying a client application within a client device, the client application associated with a server application hosted in one or more application servers;
   registering a notification service with the application servers for the client application to forward identifiers associated with the client application to the server application to enable the server application to push notification messages to the client device for the client application, a plurality of client applications are hosted in the client device, and the plurality of client applications are registered with the notification service;
   in response to receiving a notification message from the application servers, determining if the notification message carries the subtopic identifier of the client application; and
   forwarding the notification message to the client application without forwarding the notification message to another one of the plurality of client applications in the client device if the notification message carries the identifier for the client application.

2. The medium of claim 1, wherein a plurality of client applications are hosted in the client device and wherein the subtopic identifier uniquely identifying the client application among the plurality of client applications.

3. The medium of claim 1, wherein the identifiers include the subtopic identifier.

4. The medium of claim 3, wherein the identifiers include a device token uniquely identifying the client device.

5. The medium of claim 2, wherein the application servers are uniquely identified by a topic identifier and wherein the registration further comprising:
   registering the client application for the topic identifier to listen to notifications from the application servers, wherein more than one of the client applications are registered for the topic identifier.

6. The medium of claim 5, wherein each of the more than one of the client applications corresponds to separate server application hosted in the application servers.

7. The medium of claim 5, wherein the method further comprises:
   initiating a network connection with the application servers; and sending the identifiers over the network connection to the application servers.

8. The medium of claim 7, wherein the method further comprises:
receiving the topic identifier from the network connection, wherein the network connection is disconnected while the client application waiting for the notifications.

9. The medium of claim 5, wherein the determination comprises:
extracting the topic identifier from the notification message; and
forwarding the notification message to each client application registered for the topic string if the notification message does not carry the subtopic identifier.

10. The medium of claim 1, wherein the forwarding comprises invoking the client application if the client application is not currently active.

11. The medium of claim 10, wherein at least one of the other applications is not currently active and wherein the notification message is forwarded without invoking the at least one other application.

12. A machine-readable non-transitory medium having instructions, when executed by a machine, cause the machine to perform a method for providing message notification, the method comprising:
receiving, at a server application hosted in an application server, a registration request from a client application of a client device for the message notification, the request having identifiers including a device token identifying the client device and a client application identifier identifying the client application;
sending a server identifier for the client device to allow the client device to listen to messages pushed from the application server;
storing the received identifiers to register the client device for the message notification; and
sending notification messages to the client device to notify the client application, the notification messages identified by the server identifier and the notification messages embedding the client application identifier, wherein a plurality of client applications are hosted in the client device, the plurality of client applications are registered to receive message notifications, and the notification messages are sent to the client device to notify the client application without forwarding the notification message to another one of the plurality of client applications in the client device.

13. The medium of claim 12, wherein the registration request is received over a network connection initiated by the client device, and wherein the server identifier is sent over the network connection.

14. The medium of claim 12, wherein the client token is stored associated with an opaque data including the client application identifier, wherein opaque data is data that is passed from the server application to the client application.

15. The medium of claim 14, wherein the notification messages include the device token to identify the client device and wherein the opaque data is carried in payloads of the notification messages.

16. The medium of claim 12, wherein the sending comprises:
establish a network connection with a push server in a push service; and
sending the notification messages over the network connection to the push server, wherein the notification messages are packaged with the server identifier.

17. The medium of claim 16, wherein the server identifier is received in a certificate from an authority of the push service, and wherein the server identifier uniquely identifies the application server sharing the push service.

18. A machine implemented method for message notification, the method comprising:
generating a subtopic identifier identifying a client application within a client device, the client application associated with a server application hosted in one or more application servers;
registering notification service with the application servers for the client application to forward identifiers associated with the client application to the server application to enable the server application to push notification messages to the client device for the client application, a plurality of client applications are hosted in the client device, and the plurality of client applications are registered with the notification service;
in response to receiving a notification message from the application servers, determining if the notification message carries the subtopic identifier of the client application; and
forwarding the notification message to the client application without forwarding the notification message to another one of the plurality of client applications in the client device if the notification message carries the identifier for the client application.

19. A machine implemented method for providing message notification, the method comprising:
receiving, at a server application hosted in an application server, a registration request from a client application of a client device for the message notification, the request having identifiers including a client token identifying the client device and a client application identifier identifying the client application;
sending a server identifier for the client device to allow the client device to listen to messages pushed from the application server;
storing the received identifiers to register the client device for the message notification; and
sending notification messages to the client device via the client token to notify the client application, the notification messages identified by the server identifier and the notification messages embedding the client application identifier, wherein a plurality of client applications are hosted in the client device, the plurality of client applications are registered to receive message notifications, and the notification messages are sent to the client device to notify the client application without forwarding the notification message to another one of the plurality of client applications in the client device.

20. An apparatus, comprising:
a memory storing executable instructions including a server application;
a network interface coupled to a push network;
a processor coupled to the network interface and the memory to execute the executable instructions from the memory for the messaging services, the processor being configured to:
in response to an initiation from a client device, establishing a first network connection with the client device via the network interface,
receiving, at the server application, a registration request from the client application of a client device over the first network connection, the request having identifiers including a client token identifying the client device and a client application identifier identifying the client application, sending a server identifier for the client device to allow the client device to listen to messages pushed from the application server, storing the received identifiers to register the client device for the message notification, sending notification messages to the client device over a second network connection to the push network via the network interface, the notification messages having the client token to notify the client application, the notification messages identified by the server identifier and the notification messages embedding the client application identifier, wherein a plurality of client applications are hosted in the client device, the plurality of client applications are registered to receive message notifications, and the notification messages are sent to the client device to notify the client application without forwarding the notification message to another one of the plurality of client applications in the client device.

\* \* \* \* \*